(12) United States Patent
Zillmann

(10) Patent No.: US 7,121,126 B2
(45) Date of Patent: Oct. 17, 2006

(54) APPARATUS FOR LOCKING A MOTOR-VEHICLE STEERING SHAFT

(75) Inventor: Horst Zillmann, München (DE)

(73) Assignee: Huf Hulsbeck & Furst GmbH & Co KG, Velbert (DE)

( * ) Notice: Subject to any disclaimer, the term of this patent is extended or adjusted under 35 U.S.C. 154(b) by 368 days.

(21) Appl. No.: 10/682,194

(22) Filed: Oct. 10, 2003

(65) Prior Publication Data
US 2004/0075232 A1 Apr. 22, 2004

(30) Foreign Application Priority Data
Oct. 14, 2002 (DE) ................. 102 47 803

(51) Int. Cl.
B60R 25/02 (2006.01)

(52) U.S. Cl. .......................... 70/186; 70/252

(58) Field of Classification Search .......... 70/182–186, 70/252
See application file for complete search history.

(56) References Cited

U.S. PATENT DOCUMENTS

| 5,595,079 | A | * | 1/1997 | Myers | 70/233 |
| 6,125,671 | A | * | 10/2000 | Suzuki | 70/186 |
| 6,237,378 | B1 | * | 5/2001 | Canard | 70/252 |
| 6,295,848 | B1 | * | 10/2001 | Suzuki | 70/186 |
| 6,327,882 | B1 | * | 12/2001 | Canard | 70/186 |
| 6,354,117 | B1 | * | 3/2002 | Canard | 70/186 |
| 6,354,118 | B1 | * | 3/2002 | Frick et al. | 70/186 |
| 6,439,011 | B1 | * | 8/2002 | Frick et al. | 70/185 |
| 6,516,640 | B1 | * | 2/2003 | Jacobs et al. | 70/186 |
| 6,539,756 | B1 | * | 4/2003 | Bartels et al. | 70/186 |
| 6,543,262 | B1 | * | 4/2003 | Limburg et al. | 70/186 |
| 6,647,751 | B1 | * | 11/2003 | Zillmann | 70/186 |
| 6,755,058 | B1 | * | 6/2004 | Zillmann | 70/252 |
| 6,915,671 | B1 | * | 7/2005 | Zillmann | 70/186 |
| 6,931,896 | B1 | * | 8/2005 | Ochi | 70/186 |
| 2004/0148983 | A1 | * | 8/2004 | Suzuki et al. | 70/186 |
| 2004/0182121 | A1 | * | 9/2004 | Fukatsu et al. | 70/186 |

FOREIGN PATENT DOCUMENTS

| DE | 92 08 698.5 | 10/1992 |
| DE | 196 14 436 C1 | 6/1997 |
| DE | 101 03 182 A1 | 7/2002 |
| EP | 0 953 487 A1 | 11/1999 |
| EP | 0 995 648 A1 | 4/2000 |
| FR | 2 777 521 A1 | 10/1999 |

* cited by examiner

Primary Examiner—Suzanne Dino Barrett
(74) Attorney, Agent, or Firm—Bacon & Thomas, PLLC

(57) ABSTRACT

A locking bolt for irrotationally locking a motor-vehicle steering shaft is axially movable inside a housing between locked and release positions, and is fixable in the locked position by means of a spring-loaded securing pin axially movable in the housing that cooperates with a lateral recess in the bolt. The bolt is fixed in the event a part of the housing fitted with a retaining arm retaining the securing pin against the action of its spring load is removed, thereby releasing the securing pin to fix the bolt. The securing pin is not manipulable after its release by removal of the housing part and the retaining arm because it is neither visible nor accessible through the cavity in the housing through which the retaining arm extends.

10 Claims, 4 Drawing Sheets

APPARATUS FOR LOCKING A MOTOR-VEHICLE STEERING SHAFT

BACKGROUND

A. Field

The present invention relates to apparatus for locking a motor vehicle steering shaft against rotation by means of a locking bolt axially displaceable within a housing between a locked position and a release position, wherein the locking bolt is fixable in its locked position by a spring-loaded securing pin which is axially displaceable inside the housing so as to cooperate with a lateral locking bolt recess to lock the locking bolt in the locked position upon removal of a housing portion that is fitted with an arm normally retaining the securing pin against its spring load to thereby release the pin to move to its locking position where it is inaccessible.

B. Related Art

Apparatus to lock motor vehicle steering shafts against rotation wherein, when a part of the housing is removed, the locking bolt is fixed in its locking position by means of a spring-loaded securing pin which is supported in an axially displaceable manner in the housing, and which cooperates with a lateral locking bolt recess, are known in a number of different designs.

Such designs include motor-vehicle steering locks wherein the securing pin is supported against its spring load by a retaining wire or pin which is axially displaceable inside the housing parallel to the locking bolt and cooperating at its end located away from the securing pin with a lock cylinder or with the locking bolt control cam connected to the lock cylinder's core in order to move axially upon removal of the housing part enclosing the locking cylinder, and, eventually the control cam to release the securing pin, whereby, under the spring loading, it enters and engages the lateral recess of the locking bolt (German patent 31 31 558 C1 and German utility model 92 08 698 U1).

Further among such known apparatus is an apparatus of the above-mentioned kind for locking a motor-vehicle steering shaft against rotation wherein the locking bolt securing pin is retained against its spring loading by a retaining arm inwardly projecting from the housing, the securing pin being released by removal of the housing part fitted with the retaining arm to thereby move due to its spring loading into the locking bolt's lateral recess. At its end located away from the locking bolt, the securing pin is loaded by a helical compression spring and rests at its end located near said bolt against the retaining arm (German publication 100 41 984 A1).

Moreover a motor-vehicle steering lock is known that locks the steering shaft against rotation using a locking bolt which, by means of a locking cylinder, can be axially reciprocated between a locked and a release position and, like the locking cylinder, is mounted within a housing provided with an assembly aperture closed by a lid, the latter being fixed to the housing, for instance by caulking, and being secured by a sheetmetal strip in the manner of a latch running parallel to the longitudinal locking cylinder axis and received in a guide groove of the housing and engaging a clearance of a right angle structure of the said lid in such manner that it cannot be pulled out of it. Said sheetmetal strip moreover may cooperate with a spring-loaded securing pin axially displaceable in the housing in order to retain said pin against the spring load and release it, as a result of which, on account of its spring load, it moves to engage a lateral recess of the locking bolt and fixes it in its locking position if the sheetmetal strip should break due to the locking cylinder being torn out or being broken away or when the lid is lifted (German patent 196 14 436 C1).

BRIEF SUMMARY OF THE INVENTION

The objective of the present invention is to provide an apparatus of the above discussed type where, after the locking bolt has been fixed in place by the securing pin, the securing pin is inaccessible so that it cannot be disengaged from the recess of the locking bolt.

This goal is attained by the features disclosed below, wherein a preferred embodiment of the invention is presented and illustrated.

DETAILED DESCRIPTION

Figure 1:
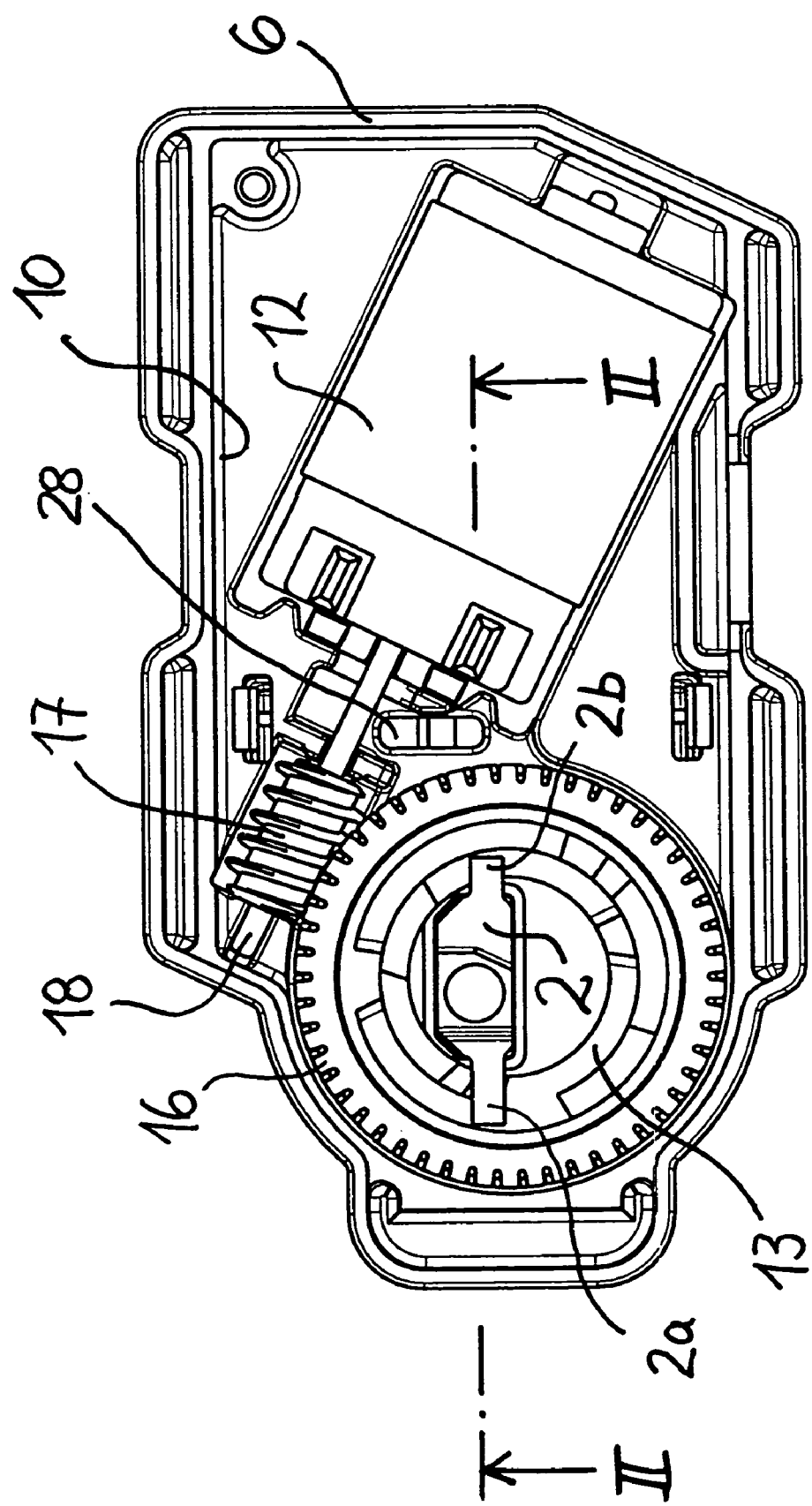
FIG. 1 is a top view looking in the direction of the arrow I of FIG. 4.

The shown apparatus to irrotationally lock the steering shaft 1 of a motor vehicle comprises a locking bolt 2 cooperating with a locking sleeve 3 affixed to the steering shaft 1 and fitted with locking grooves 4. The steering shaft 1 and the looking sleeve 3 are enclosed by a tubular casing (not shown) provided with an opening through which the locking bolt 2 can pass.

The locking bolt 2 is rectangular in cross-section and is displaceably supported in its axial direction within a bore 5 of corresponding cross-section in a housing 6, the longitudinal axis 7 of said bore 5 intersecting the common longitudinal axis 8 of the steering shaft 1 and its coaxial tubular casing orthogonally. On the side away from the steering shaft 1 and the tubular casing, the housing 6 mounted to the tubular casing comprises an assembly aperture 10 closed by a lid 9.

Figure 2:
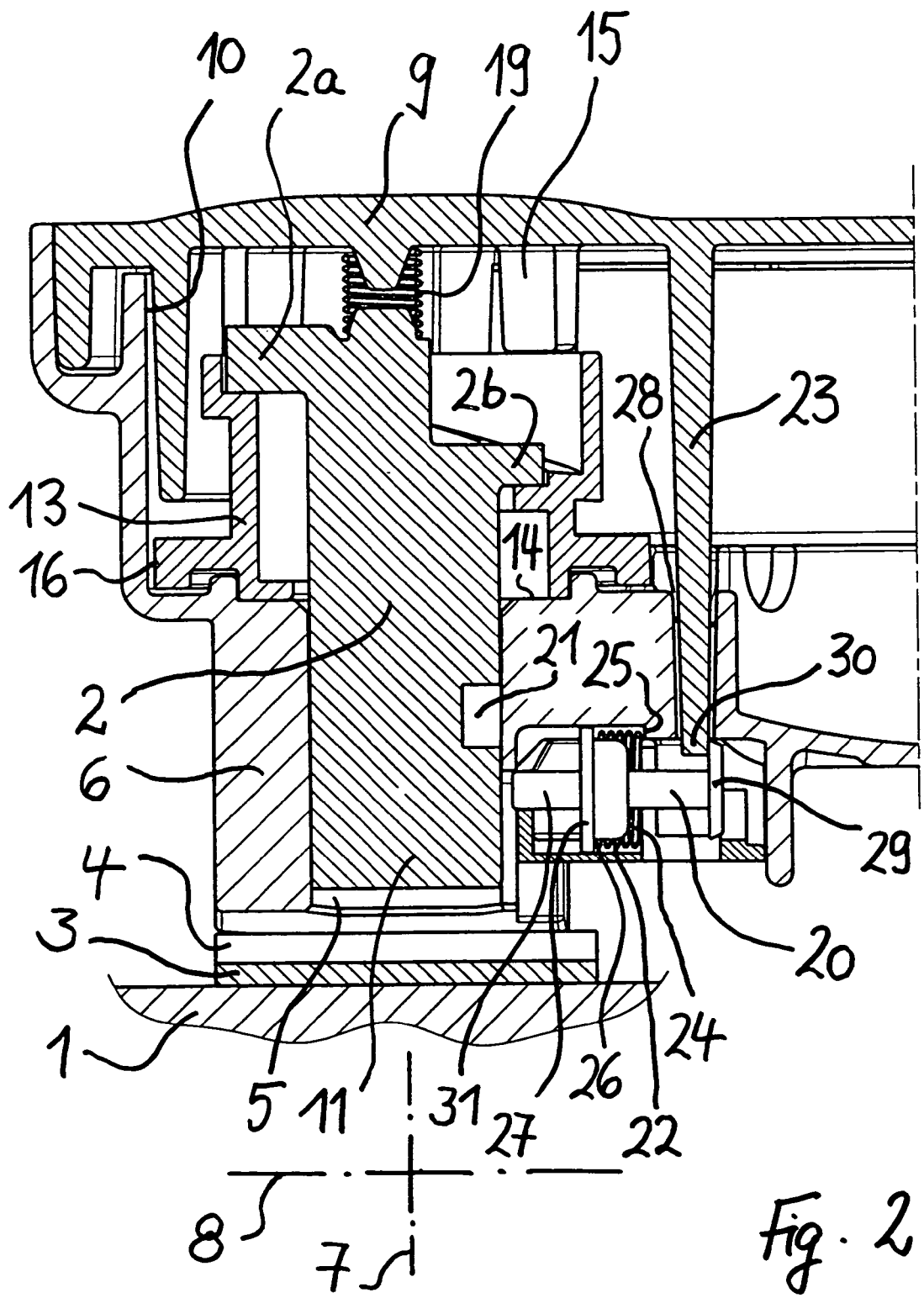
FIG. 2 is a longitudinal section view taken along line II—II of FIG. 1 shown on a larger scale and without the electric motor, the locking bolt being in its release position.
Figure 3:
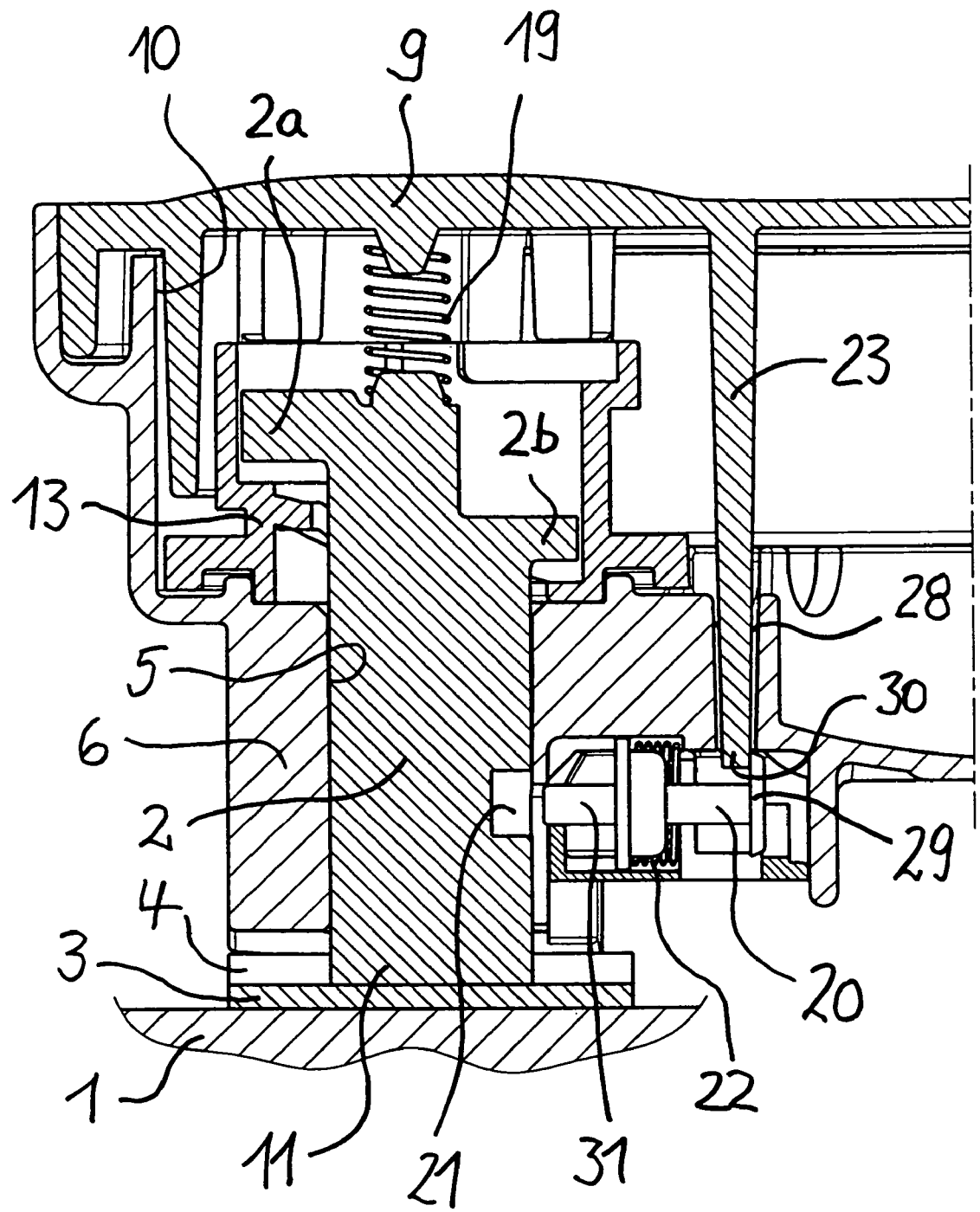
FIG. 3 is a longitudinal section view similar to that of FIG. 2, the locking bolt being in its locked position.
Figure 4:
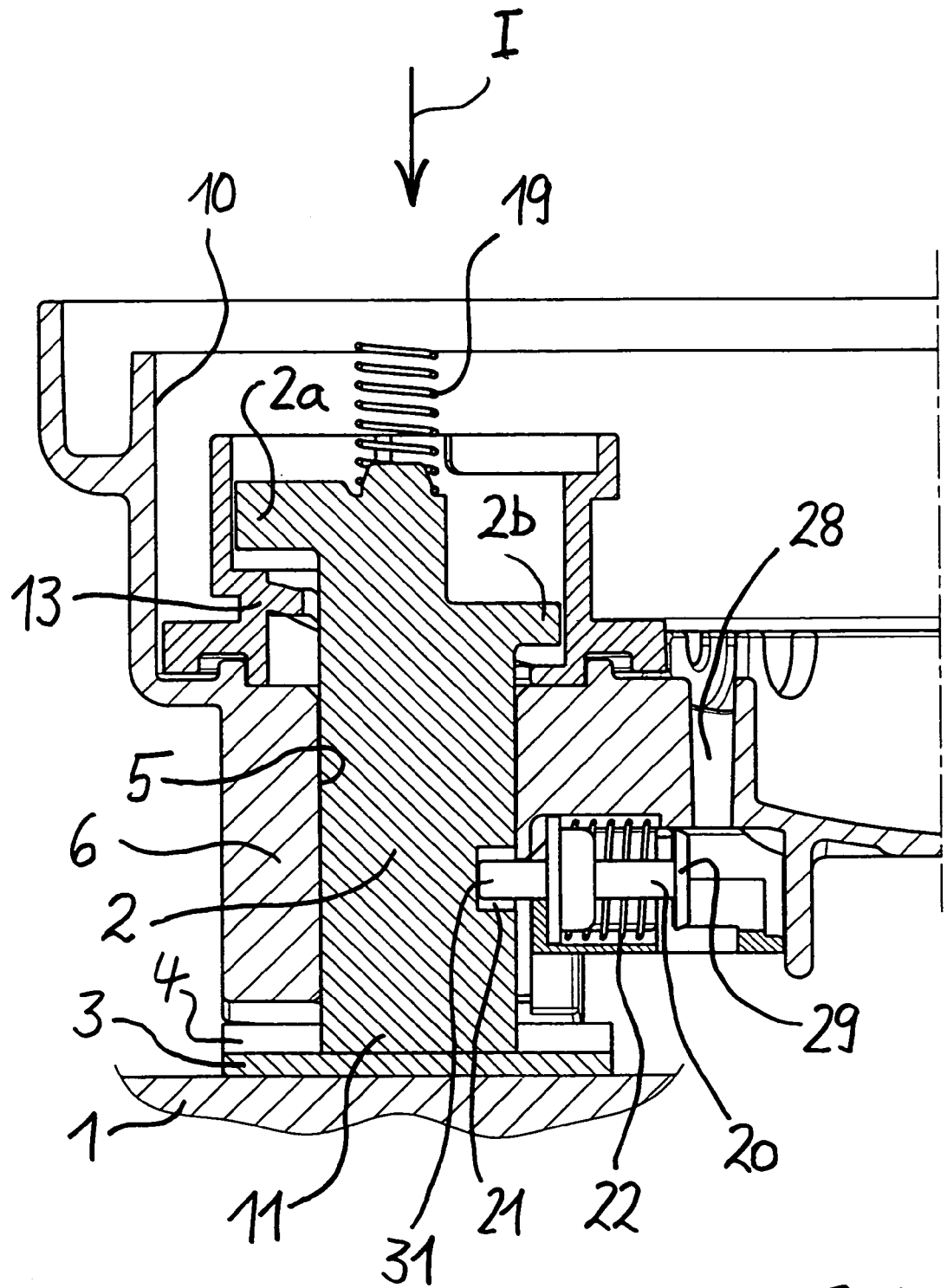
FIG. 4 is a longitudinal section view similar to that of FIG. 3, the sealing lid having been removed and the locking bolt being secured in its locked position.

The locking bolt 2 is reciprocable between, on one hand, the locked position shown in FIGS. 3 and 4, whereat, by its end 11 adjacent to the steering shaft 1, it enters a locking groove 4 of the locking sleeve 3, such that the steering shaft 1 is now kept irrotational, and, on the other hand, the release position shown in FIG. 2, whereat the locking bolt 2 by its end 11 does not engage any locking groove 4 of the locking sleeve 3, so that the steering shaft 1 is released for rotation again.

A control element 13 rotatable to-and-fro by a reversible electric motor 12 is used to axially displace the locking bolt 2 into the release position, and also in the opposite direction into the locked position. This control element 13 is disposed substantially coaxially with the locking bolt 2 and surrounds it, and is supported in the housing 6 so as to be rotatable about an axis running parallel to the longitudinal axis 7 of the locking bolt bore 5 between an annular surface 14 of the housing 6 extending coaxially with said axis and a ring of inner protrusions 15 on the sealing lid 9 of the assembly aperture 10 of said housing 6, said ring also being coaxial with said axis. The control element 13 is designed to be a bush-like worm gear fitted with outer teeth 16 that are engaged by a drive worm 17 mounted on the output shaft 18 of the electric motor 12 in the manner illustrated in FIG. 1.

The locking bolt 2 is fitted with two external protrusions 2a, 2b cooperating with two inner inclined surfaces of the control element 13. The two inclined surfaces are of the same slope and each merges at its two ends into a respective end surface disposed in a plane which is perpendicular to the axis of rotation of the control element 13. A helical compression spring 19 is mounted between the looking bolt 2 and the sealing lid 9 of the assembly apertures 0 of the housing 6 and presses the protrusions 2a, 2b of the locking bolt 2 against said oblique surfaces of the control element 13.

When the locking bolt 2 is in the locked position, its two protrusions 2a, 2b are respectively opposite the associated end surface of the control element 13 closer to the steering shaft 1. When the locking bolt 2 assumes the release position, then its two protrusions 2a, 2b rest on the particular associated end surface of the control element 13 which is the more remote from the steering shaft 1. The electric motor 12 is turned ON so as to rotate the control element 13 clockwise or counter-clockwise whereby the two protrusions 2a, 2b of the locking bolt 2 run over the two oblique surfaces of the control element 13 from the two end surfaces near the steering shaft 1 to the two end surfaces farther from the steering shaft 1, or vice-versa from the two end surfaces farther from the steering shaft, to the two end surfaces nearer the steering shaft 1 of the control element 13—in order to axially displace the locking bolt 2 against the force of the helical compression spring 19 out of the locked position into the release position or to let it run axially under the force of the helical compression spring 19 out of the release position into the locked position.

A securing pin 20 rests in an axially displaceable manner in the housing 6 and serves to fix the locking bolt 2 in its locked position when the sealing lid 9 of the assembly aperture 10 mounted on said housing 6 is removed from it, said securing pin 20 extending radially to the longitudinal axis 7 common to the locking-bolt bore 5 in the housing 6 and to the locking bolt 2. The securing pin 20 cooperates with a lateral recess 21 in the locking bolt 2 that preferably is configured as a blind hole and is loaded by a helical compression spring 22 in the direction toward the locking bolt 2. The securing pin 20 is held against axial motion by a retaining arm 23 which projects inwardly from the sealing lid 9 and which runs parallel to the locking bolt 2 so that it engages the securing pin 20 behind the helical compression spring 22, when looking from the locking bolt 2, and retains the securing pin 20 against the force of the helical compression spring 22 in the position as shown in FIGS. 2 and 3 so that it cannot enter the recess 21 of the locking bolt 2.

The securing pin 20 runs through the helical compression spring 22. By its end 24 located away from the locking bolt 2, the helical compression spring 22 rests against an annular shoulder 25 of the housing 6, and, at its end 26 near the locking bolt 2, it rests against an annular projection 27 of the securing pin 20.

The retaining arm 23 of the sealing lid 9 has the shape of a bar and projects through a matching cavity 28 in the form of a shaft of the housing 6 toward the securing pin 20 so as to engage the end 29 of the latter located away from the locking bolt 2. This end 29 of the securing pin 20 is radially flanged, i.e., has the shape of a disk, and is engaged on the side towards its direction of locking motion by the free end 30 of the retaining arm 23.

If the sealing lid 9 of the assembly aperture 10 is removed from the housing 6 while the locking bolt 2 is in the locked position as shown in FIG. 3, then the bar-shaped retaining arm 23 carried by the sealing lid 9 will be removed from the shaft-shaped cavity 28 of the housing 6 and the free end 30 of the retaining arm 23 will move from behind the radially flanged disk-shaped end 29 of the securing pin 20 located away from the locking bolt, as a result of which the helical compression spring 22 will move the securing pin 20 by its segment 31 near the locking bolt 2 into the lateral recess 21 of the locking bolt 2, said recess 21 being aligned with the securing pin 20.

The situation of FIG. 4 is then attained, wherein the locking bolt 2 is fixed in its locked position by the securing pin 20 and its free end 11 is now prevented from moving out of the locking groove 4 of the locking sleeve 3. The radially flanged, disk-shaped end 29 located away from the locking bolt 2 of the securing pin 20, the segment 31 of which engages the blind-hole lateral recess 21 of the locking bolt 2, is then disposed as seen from the locking bolt 2, in front of the shaft-shaped cavity 28 in the housing 6 adapted to receive the bar-shaped retaining arm 23 and cannot be seen and is not accessible through the open cavity 28 to enable disengagement of the securing pin 20 from the recess 21 of the locking bolt 2 to release the latter's fixation.

The invention claimed is:

1. Apparatus for irrotationally locking a motor-vehicle steering shaft comprising a locking bolt axially reciprocable within a housing between a locked position and a release position, said locking bolt being fixable in its locked position by a securing pin which is axially displaceable in said housing and which is biased by a spring towards the locking bolt, said spring having a side thereof that is remote from the locking bolt;

said securing pin in its locking bolt fixing position cooperating with a lateral recess of the locking bolt such that upon removal of a housing portion that is fitted with a retaining arm retaining the securing pin against the spring load of said spring, the securing pin is released to cooperate with said recess to fix the locking bolt in its locked position;

said retaining arm extending through a matching cavity in the housing and normally engaging the securing pin on the side of the spring remote from the locking bolt in order to retain the securing pin against the bias of said spring, and an end of the securing pin remote from the locking bolt being located on that side of said cavity of the housing which is adjacent to the locking bolt when an other end of the pin closer to the locking bolt engages the recess of said locking bolt to fix the locking bolt;

said securing pin being neither visible nor accessible through the cavity when the cavity is unoccupied by said retaining arm and in the open state, and when the securing pin is moved to its locking bolt fixing position with said other end closer to the locking bolt engaging the locking bolt recess.

2. Apparatus as claimed in claim 1, wherein the retaining arm extends parallel to the locking bolt.

3. Apparatus as claimed in claim 1, wherein the housing portion provided with the retaining arm is a removable sealing lid for an assembly aperture in the housing.

4. Apparatus as claimed in claim 3, wherein the housing has a side located toward the steering shaft and a side located away from the steering shaft, the assembly aperture being located on that side of the housing which is located away from the steering shaft.

5. Apparatus as claimed in claim 1, wherein the retaining arm is a rod and projects through the cavity in the form of a shaft toward the securing pin.

6. Apparatus as claimed in claim 1, wherein the retaining arm engages said end of the securing pin remote from the locking bolt.

7. Apparatus as claimed in claim 6, wherein said end of the securing pin away from the locking bolt has a disk-shape and is engaged by a free end of the retaining arm.

8. Apparatus as claimed in claim 1, wherein said spring is a helical compression spring, and wherein the securing pin extends through and is loaded by the helical compression spring which at an end away from the locking bolt rests against an annular shoulder of the housing and at an end near the locking bolt rests against an annular projection of the securing pin.

9. Apparatus as claimed in claim 1, wherein the securing pin extends radially with respect to the longitudinal axis of the locking bolt.

10. Apparatus as claimed in claim 9, wherein the lateral recess of the locking bolt is a blind hole.

\* \* \* \* \*